United States Patent [19]

Roberts

[11] Patent Number: 4,594,905
[45] Date of Patent: Jun. 17, 1986

[54] LIQUID ANALYZER

[76] Inventor: Ronald B. Roberts, c/o Southeastern Liquid Analyzers, 300 W. Liberty St., P.O. Box 754, York, S.C. 29745

[21] Appl. No.: 673,698

[22] Filed: Nov. 21, 1984

Related U.S. Application Data

[63] Continuation-in-part of Ser. No. 430,936, Sep. 8, 1983, abandoned.

[51] Int. Cl.⁴ .............................................. G01F 23/04
[52] U.S. Cl. .............................. 73/864.63; 73/864.64; 374/141
[58] Field of Search ........... 73/864.63, 864.64, 864.65, 73/864.66, 864.67, 863.71, 863.81, 863.86, 863.85, 291, 297, 298

[56] References Cited

U.S. PATENT DOCUMENTS

| | | | |
|---|---|---|---|
| 1,880,868 | 10/1932 | Lancey | 73/864.63 |
| 2,613,848 | 10/1952 | Wood | 73/864.63 |
| 2,862,561 | 12/1958 | Teubneir | 73/864.63 |
| 3,247,721 | 4/1966 | Johnson | 73/864.63 |
| 3,459,263 | 8/1968 | Drivet | 73/864.63 |
| 3,537,316 | 11/1970 | Stewart et al. | 73/864.63 |
| 3,594,906 | 7/1971 | Kerfoot | 73/864.64 |
| 4,329,883 | 5/1982 | Barnes | 73/864.63 |
| 4,346,519 | 8/1982 | Milo | 73/864.63 |
| 4,463,804 | 8/1984 | Rooney et al. | 73/864.63 |

Primary Examiner—Charles Frankfort
Assistant Examiner—David R. Schuster
Attorney, Agent, or Firm—Henderson & Sturm

[57] ABSTRACT

An improved liquid analyzer apparatus (10) comprising an elongated tubular unit (11); a closure unit (12); a closure actuator unit (13); a guiding unit (14); travel limit means (15); and a temperature indicating unit (16); wherein by use of the analyzer (10), both the content and condition of fuel (101) within a fuel storage container (100) can be determined.

2 Claims, 5 Drawing Figures

LIQUID ANALYZER

This application is a continuation-in-part application of U.S. application Ser. No. 430,936 filed Sept. 8, 1983 now abandoned, and entitled "LIQUID ANALYZER", the contents of which are incorporated herein by reference.

TECHNICAL FIELD

The present invention relates generally to liquid sampling apparatus.

BACKGROUND OF THE INVENTION

The prior art is replete with liquid analyzers as is evidenced by the content of the following U.S. Pat. Nos. 3,380,168; 4,197,744; 3,371,538; 3,841,162; and 4,335,060.

As can be seen by reference to the aforementioned prior art patents, this area of technology is extremely crowded, and the patented devices share many of the same structural components. The most common structural features found in the prior art comprise an elongated tubular element; a closure element operatively controlling one end of the tubular element; and an actuating means operatively associated with the closure element, to control the opening and closing of the one end of the tubular element.

Despite the structural similarities mentioned above, there are also a variety of both structural and functional distinctions present in the previously patented apparatus.

In light of the foregoing situation, and particularly in view of the large number of patents present in the field, it should be fairly obvious that, as of the present time, a perfect or ideal liquid analyzer had yet to be developed, at least as represented by the patent literature available.

It should also be fairly obvious that, even though the prior art shared the same basic components, and operated on the same basic principles, something was missing, lacking and/or deficient in the existing structures.

BRIEF SUMMARY OF THE INVENTION

The present invention is similar to the prior art devices in that it also comprises an elongated tubular unit; a closure unit; and, a closure actuator unit. However, at this point the similarities between the patented structures and the present invention ends.

The present invention further comprises a guiding unit; an actuator travel limiting means; and, a temperature indicating unit.

The guiding unit comprises a plurality of narrow profile, spider guiding elements, that are spaced along the running length of the closure actuating unit. These spider guiding elements space the closure actuating unit from the sides of the tubular unit, while allowing virtually turbulence free flow of the liquid into the tubular element.

The actuator travel limiting means comprises a distinct structural element mounted on the closure actuating unit that cooperates with the upper portion of a closure unit receiving element. In addition, the travel limiting means also comprises an internal shoulder formed in the closure unit receiving element that cooperates with the closure element of the closure unit. The distinct structural element limits the downward travel of the closure element, and the internal shoulder limits the upward travel of the closure element.

The temperature indicating unit comprises a temperature sensing element slidingly secured to a portion of the closure actuating unit. The temperature sensing element comprises a thermometer member operatively connected to a portion of the closure actuating unit, and slidably disposed thereon; so that the thermometer member can be translated along the running length of the closure actuating unit, to insure that the temperature readings are representative of the liquid, and not the ambient environment above the liquid.

BRIEF DESCRIPTION OF THE DRAWINGS

These and other objects, advantages, and novel features of the invention will become apparent from the detailed description of the best mode for carrying out the invention which follows, when considered in conjunction with the accompanying drawings, wherein.

BEST MODE FOR CARRYING OUT THE INVENTION

Figure 2:
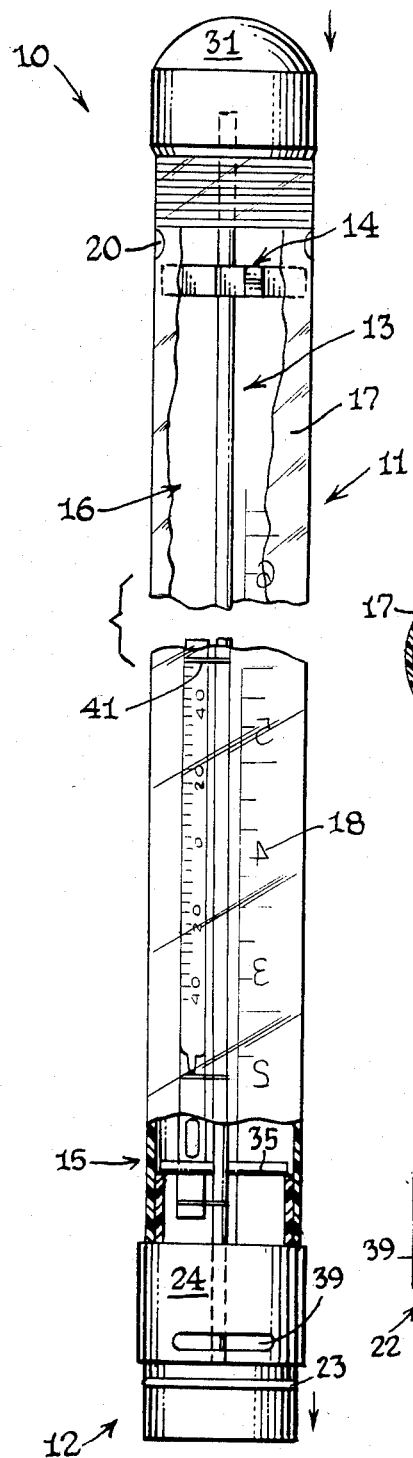
FIG. 2 is a side view of the liquid analyzer in its intake position.
Figure 3:
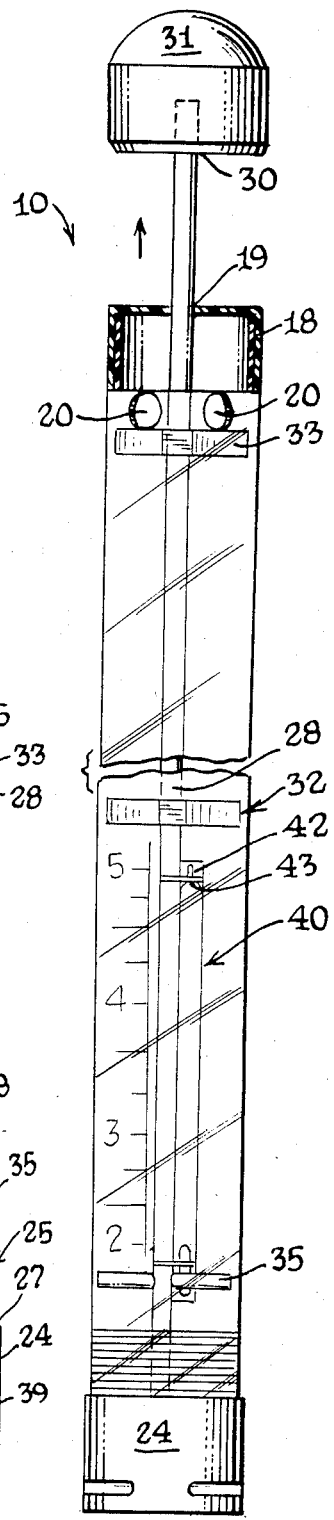
FIG. 3 is a side view of the liquid analyzer in its closed position.

As can best be seen by reference to FIGS. 2 and 3, the improved liquid analyzer apparatus that forms the basis of the present invention is designated generally by the numeral (10). The apparatus (10) comprises in general an elongated tubular unit (11); a closure unit (12); a closure actuator unit (13); and a temperature indicating unit (16). These units will now be described in seriatim fashion.

Figure 1:
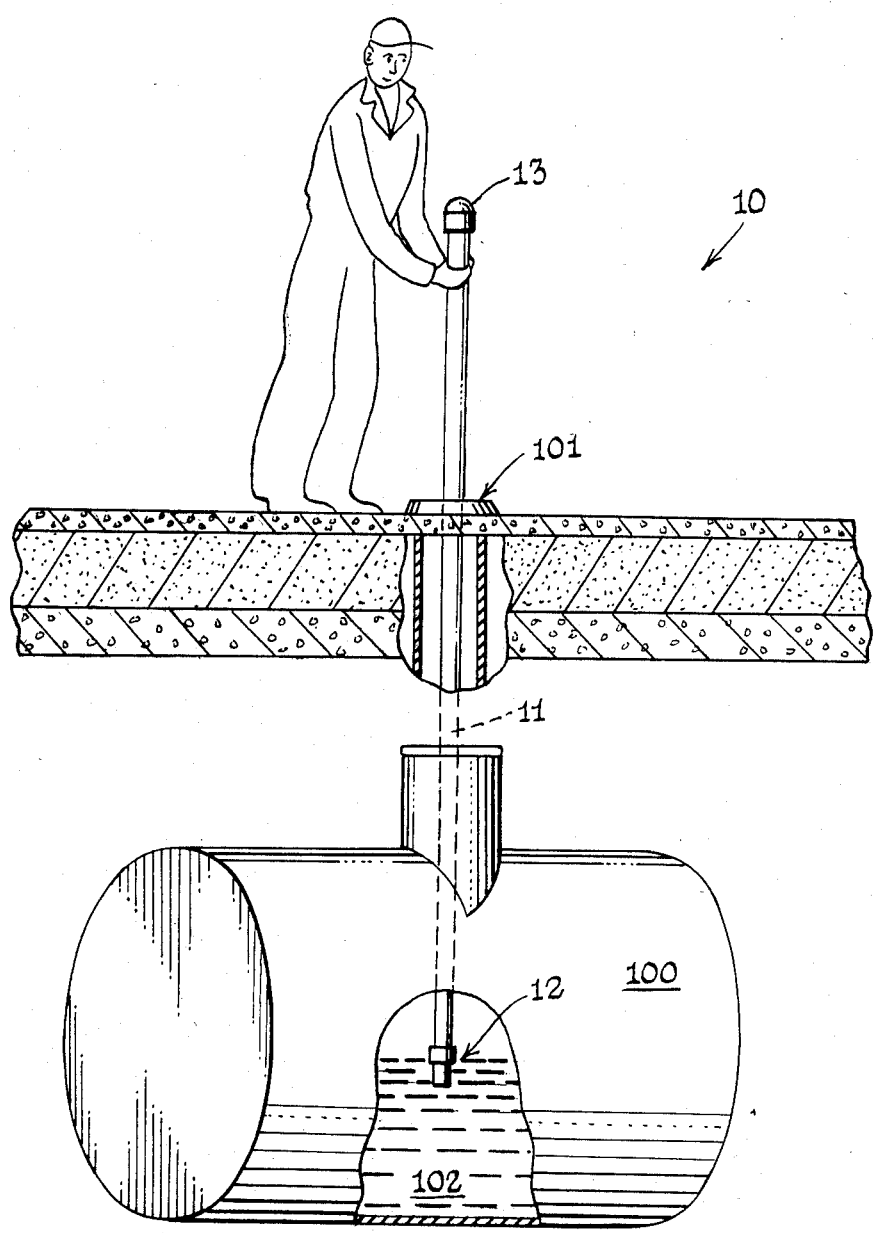
FIG. 1 is a perspective view of the liquid analyzer in use.

As shown in FIG. 1, the apparatus (10) is intended for use primarily in conjunction with a fuel storage container (100) having a sealable opening (101) through which fuel (102) is introduced into the storage container (100). The sealable opening (101) is further dimensioned to receive the apparatus (10) for the purpose of anlalyzing the fuel with respect to the liquid level contained within the storage container (100), as well as the presence or absence of contaminants or residue contained therein.

As depicted in FIG. 1, the elongated tubular unit (11) comprises an elongated, clear, hollow, rigid tubular element (17) having gradation (18) indicative of length imprinted on its surface. The elongated tubular element (17) is preferably fabricated from plastic, nylon, or other similar clear, rigid material, that is impervious to the normally deleterious compounds and elements found in fuel storage facilities.

As can best be seen by reference to FIGS. 2 and 3, the top of the elongated tubular element (17) must have a sufficient length to extend from a point above ground, to the bottom of the storage container (100). While the tubular element (17) is shown as an integral construction, this is for illustration purposes only. As a practical matter, this invention also intends for the tubular element (17) to comprise a plurality of tubular sections that can be joined together in a liquid tight manner, by any number of well recognized securing arrangements.

Figure 5:
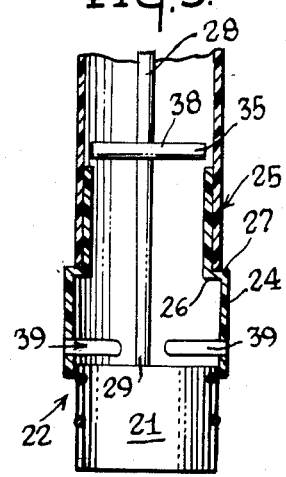
FIG. 5 is a cross-sectional view of the closure unit travel limiting means.

The closure unit (12) is best seen by reference to FIG. 5, and comprises a cylindrical closure element (21) provided with sealing means (22) in the form of at least one O-ring (23) disposed around its periphery. The closure unit (12) also comprises a hollow, generally cylindrical closure sealing element (24) fixedly secured to the bottom of the tubular element (17).

The closure sealing element (24) has a reduced diameter portion (25) that forms an internal (26) and external (27) stepped shoulder. The internal stepped shoulder (26) acts both as a seat for the closure element (21), as well as a portion of the closure travel limit means (15). The reduced diameter portion (25) of the closure seating element (24) is dimensioned to be received within the bottom of the tubular element (17) and secured thereto in a liquid tight relationship, with the external stepped shoulder (27) abutting the bottom of the tubular element (17).

The enlarged diameter portion (25) of the closure seating element (24) is dimensioned to slidingly receive the cylindrical closure element (21) and cooperate with the sealing means (22) to provide a liquid tight seal when the closure element (21) engages the internal shoulder (26) of the closure seating element (24). In addition, the periphery of the enlarged diameter portion (25), is provided with a plurality of elongated fluid apertures (39) that allow the ingress and egress of the liquid (102) into the elongated tubular member (17), when the closure element (21) has assumed its downwardmost position.

The closure actuating unit (13) comprises an elongated rigid rod member (28) dimensioned to be slidingly received within the central aperture (19) in the cap element (18). The rod member (28) is secured on open end (29) to the closure element (21) and provided in its other end (30) with an actuating knob (31). As shown in the drawings, the length of the rod member (28) is at least as long as the length of the elongated tubular element (17), and is also intended to comprise a plurality of rod sections that are joined together in a well recognized manner to form the rod member (28).

Figure 4:
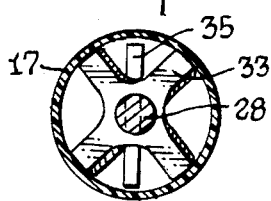
FIG. 4 is a detailed view of the spider guiding element.

As can be seen by reference to FIGS. 2 through 4, the guiding unit (14) comprises a plurality of spider elements (32) in the form of slim profile, multi-armed, apertured guide members (33) slidingly disposed on the elongated rigid rod member (28). The purpose and function of the guide members (33) are not only to guide the upward and downward movement of the actuator rod member (28), but also to prevent the rod member from scratching the clear sides of the tubular element (17). This arrangement is necessary since even a rigid rod member will be subject to flexure upon reaching a given length.

As can be seen in FIGS. 2 and 5, the closure travel limit means (15) comprise a horizontally projecting bar member (35) operatively connected to the lower portion of the rigid actuator rod (28). The bar member (35) extends across the interior of the hollow tubular element (17) and is adapted to engage the top of the reduced diameter portion (25) of the closure seating element (24), to limit the downward travel of the actuator rod (28). As mentioned supra, the relative dimensioning of the closure element (21) and the internal stepped shoulder (26) of the closure seating element (24) limit the travel of the closure element in the upward direction.

As best shown in FIG. 5, the stroke of the travel limit means (15) is designed to place the top of the closure element (21) adjacent the bottom of the fluid apertures (39) in the fully open mode. In addition, the closure element (21) is dimensioned such that the bottom of the closure element (21) is flush with the bottom of closure seat element (24) in the fully closed mode. This arrangement insures that the relative movement between the respective components is restricted to the greatest extent possible, while still providing unimpeded flow of fluid into the tubular element (17).

It should also be noted at this junction that, while the bar member (35) may comprise a plurality of short ear elements (not shown) secured (as by welding) to the rod member (28), practical experience has dictated that the bar member (35) should be a solid integral member that is inserted through a suitably dimensioned aperture (38) in the rod member (28).

The temperature indicating unit (16) is depicted in FIGS. 2 and 3 and comprises at least one temperature sensing element (40) such as a thermometer (41) that is slidingly disposed on the elongated rigid actuator rod member (28).

As shown in the drawings, the thermometer is received within a transparent holder element (42) that exposes the thermometer to the liquid environment. In addition, the holder element (42) is also provided with one or more frictional securing elements (43) that permit sliding translation of the temperature indicating units (16) along the actuator rod (28).

As mentioned earlier in the specification, the apparatus (10) was developed specifically for use in the fuel industry; however, it should be obvious that the apparatus may be usefully employed in other environments as well. Given the fact that the fuel industry is considered the primary environment for deployment of the apparatus, the inclusion of the temperature indicating unit (16) is considered crucial to this invention as will be explained shortly.

In use, the apparatus (10) is inserted downwardly into a fuel storage container (100) until the closure unit (12) contacts the bottom of the storage container. Actually, at this juncture there are two methods that can be employed with the apparatus (10) to accomplish the analysis of fuel.

The first method involves the actuation of the closure element (21) downwardly to its fully open position prior to the insertion of the apparatus into the liquid reservoir. In this mode the liquid will fill up the anlayzer tube (17) as the apparatus (10) descends into the reservoir. Once the closure element (21) contacts the bottom of the reservoir, the continued downward movement of the tubular element (17) will effect the seating of the closure element (21) within the closure seating element (24).

In this method of use, the liquid will fill up the tubular element (17) at virtually the same rate as the insertion of the apparatus (10) into the reservoir. The air, originally contained within the tube, being forced out through the portals (2) as ambient air, is displaced by the incoming liquid. This procedure produces very little turbulence in the trapped liquid and is used primarily to take core samples or to check liquid levels.

In another method of use, the apparatus is inserted into the liquid reservoir with the closure unit (12) in its closed position. Once the closure unit (12) contacts the bottom of the reservoir, the actuator unit (13) is immobilized, and the tubular element (17) is drawn upwardly to open the elongated fluid apertures (39) in the closure seating element (24). This action permits the fluid at the bottom of the reservoir to flow into the tubular element (17). The tubular element (17) is then moved downwardly to close off the fluid apertures (39) and then the apparatus is removed and inspected to check for the presence of contaminants or sediment, at or near, the bottom of the reservoir. The rapid opening of the fluid apertures (39) herein described, causes the liquid to rush into tubular element (17) whereby contaminants are virtually sucked up into the tubular elements in vacuum cleaner fashion.

In both of the aforementioned methods described, the user may obtain a fairly accurate estimate of the volume of fuel contained within the reservoir by checking the level indicated on the gradations appearing on the tubular element and also checking the temperature indicated on the thermometer (41). Inasmuch as the fuel industry has designated a temperature of 60° F. for establishing the volume of fuel inventories, the user can upgrade or downgrrade the standarized liquid volume depending on the temperature indicated on the thermometer (41).

It should also be noted at this juncture that the portals (20) as well as the apertures (39) are dimensioned such that their cross-sectional areas taken individually are greater than the cross-sectional area of the tubular element (17). This arrangement is designed to insure that the fluids (i.e., air and liquid) will encounter very little flow resistance within the tubular element (17).

As mentioned earlier, the at least one temperature sensing element (40) is slidingly disposed on the actuator rod (28). The reason for this arrangement is to allow the at least one temperature sensing element (40) to be selectively positioned slightly below the liquid level; thereby permitting the temperature to be read without having to remove the entire apparatus from the reservoir.

In some instances a plurality of temperature sensing elements (40) will be employed in conjunction with the apparatus (10), to compensate for high ambient air temperature and relatively deep liquid reservoirs, wherein there is a substantial difference in temperature at various liquid levels. In this instance, the readings from the plurality of temperature sensors (40) are averaged to arrive at the fuel inventory estimate.

Having thereby described the subject matter of this invention, it should be obvious that many substitutions, modifications and variations of the invention are possible in light of the above teachings. It is therefore to be understood that the invention as taught and described herein is only to be limited to the extent of the breadth and scope of the appended claims.

I claim:

1. An improved liquid analyzer for use in combination with a fuel storage container to check the temperature, level, content, and condition of fuel inventories, wherein the apparatus comprises:

an elongated tubular unit comprising an elongated clear hollow rigid tubular element having gradations indicative of length imprinted on its surface;

a closure unit disposed on the bottom of said rigid tubular element and comprising a cylindrical closure element provided with at least one o-ring disposed around its periphery, and further comprising a hollow generally cylindrical closure seating element fixedly secured to the bottom of said tubular element, wherein said closure seating element has a reduced diameter portion that forms an internal and external stepped shoulder, and the internal stepped shoulder acts both as a seat for the closure element as well as a portion of a closure travel limit means, wherein the reduced diameter portion of the closure seating element is dimensioned to be received within the bottom of said tubular element, and the external stepped shoulder abutts the bottom of said tubular element;

a plurality of elongated fluid apertures disposed around the periphery of said closure seating element which permit the ingress and egress of liquid into said tubular element;

a closure actuating unit comprising an elongated rigid rod member slidingly received in a centrally disposed aperture in a cap element which is secured to the top of said tubular element, wherein said elongated rigid rod member is secured on one end to the closure element, and provided on its other end with an actuating knob;

a guiding unit comprising a plurality of slim profile multi-arm apertured guide members slidingly disposed on the elongated rigid rod member;

a closure travel limit means comprising a horizontally disposed bar member connected to the lower portion of the actuator rod, and dimensioned to engage the top of the reduced diameter portion of the closure seating element; and, a temperature indicating unit comprising at least one thermometer slidingly disposed on said actuator rod, whereby said temperature indicating unit may be selectively positioned at a point below the liquid level of a reservoir.

2. An improved liquid analyzer as in claim 1; wherein said temperature indicating unit comprises:

a plurality of thermometers slidingly disposed on said actuator rod, whereby the temperature at various depths within the temperature at various depths within the reservoir may be measured to arrive at an accurate fuel inventory estimate.

* * * * *